3,332,860
Patented July 25, 1967

3,332,860

METALLIZING PLASTIC SURFACES

Adolf Diebold and Ludwig Doerr, Ludwigshafen (Rhine), Germany, assignors to Badische Anilin- & Soda-Fabrik Aktiengesellschaft, Ludwigshafen (Rhine), Germany No Drawing. Filed Sept. 17, 1964, Ser. No. 397,307
Claims priority, application Germany, Sept. 19, 1963, B 73,574
1 Claim. (Cl. 204—38)

This invention relates generally to the application of metals to the surfaces of plastics and relates in particular to the production of firmly adherent electrically conducting layers to plastics sheeting by application without current of a metal dispersion as a base layer which is then coppered without current.

Conventional plastics are generally high quality insulating materials. To make their surface suitable for the passage or leaking away of electrical currents, it is necessary either to mix them homogeneously with substances having good conductivity or to apply conducting layers to the surface. Electrically conducting coatings are required particularly often for sheeting and extruded sections, but in certain cases also for moldings prepared in other ways.

It is known that conducting layers may be provided on plastics by dispersing electrically conducting substances, as for example carbon black, graphite or metal pigments, in suitable binders and applying the conducting lacquer thus formed to the surface of the plastics, allowing it to dry thereon or completely polymerise or condense thereon. Conducting lacquers of this type containing base metals give only low conductance which does not satisfy many technical requirements. Owing to the insulating effect of the binder, the dispersed conductive particles cannot form a completely coherent conducting layer so that the conductance of a metal foil of comparable thickness is not achieved. Increasing the amount of the substance imparting conductance at the expense of the binder does not have the desired effect because in most cases the adhesion of the conducting layer to the surface of the plastics is greatly lessened. Moreover it has hitherto been necessary to subject the base metals to be processed, prior to their dispersion in the binders, to a chemical pretreatment, for example to remove the oxide film adhering to the metals or to remove gases adsorbed on the carbon black or graphite.

Conductive lacquers based on precious metals, as for example silver and silver alloys, exhibit better conductances, but they have the disadvantage that the particles dispersed in the binder and solvent are of a flaky nature and quite generally too coarse-grained, so that it is not possible to prepare very thin and adequately flexible conducting layers therefrom. A metal layer, which in many cases should not be more than about 20 microns in thickness, therefore does not adhere firmly to the plastics carrier. Attempts to decrease the particle size of the dispersed silver by expensive and protracted grinding lead to only a negligible improvement and this method is therefore unsuitable for reasons of expense.

We have now found that very firmly adherent flexible electrically conducting layers are obtained on any plastics, regenerated cellulose, protein derivatives and especially plastics sheeting, by first applying to the substrate by any conventional method iron finely dispersed in a binder and/or solvent, drying and coppering the disperse iron layer obtained in a dip without current and if desired applying further metallic conducting layers either without current or by galvanic methods. The thickness of the layer of iron applied by the process according to this invention may be from 1 to 10 microns and is preferably 5 microns. The particle size of the extremely finely dispersed iron powder should be less than 2 microns and is preferably 0.1 to 0.9 micron. The iron content of such a layer is on an average 0.5 mg./sq. cm. The reciprocal conductance of the priming iron layer to which the further layers are applied is on an average about 30,000 ohms/10 sq. cm.

In accordance with further features of the invention, priming with finely dispersed iron is carried out under the action of a magnetic field. For applying a layer of copper without current it is particularly advantageous to use a copper liquor to which not only are polybasic carboxylic acids added but also amino acids to the extent of up to 3%. In this way a degradation of the iron primary particles first occurs by size reduction of the primary particles. This may be detected by magnetic measurements. Higher magnetic values of the coercive force are measured after the first short term action of the copper salt solution than immediately after the application of the layer of iron in the first operation. In the case of a protracted action of the copper salt on the substrate coated with the dispersed iron, the values of the coercive force, remanence and saturation induction temporarily established revert to zero.

By the coating process outlined above, glossy very firmly adherent copper coatings having good conductivity are formed on the plastic surface.

We have further found that an additional lustrous coating of silver may be deposited without current on this copper layer by subsequent passage through a bath of mercury salt and/or subsequent passage through an ammoniacal bath of potassium silver cyanide. The deposit is also extremely firmly adherent and adds further advantages for certain applications.

The total conductance of the layers of iron and copper and other metals applied without current may be further increased without difficulty by additionally using galvanic methods, for example by an electrolytic deposition of copper. Additional deposits of cadmium and tin applied galvanically show particularly good conductance on an underlying layer of copper and are suitable for improving the resistance to aging of the metal coatings applied.

The thickness of the copper layer produced without current as the second priming layer is about 1 to 2 microns. With this layer, on a comparison standard for which a surface of 10 sq. cm. in the form of a strip 50 mm. in length and 20 mm. in breadth is chosen, to which the electrodes are applied at the two small sides, a reciprocal conductance of about 3 ohms is established. By additional metal layers applied galvanically in a thickness of about 2 microns, the following increases in the above reciprocal conductance of the priming layers applied with current are obtained measured on the same comparison standard (a) 0.18 ohm with a cadmium or tin deposit, (b) 0.65 ohm with a silver deposit. A galvanically deposited layer of gold of a thickness of only 1 micron increases the reciprocal conductance of the priming layer by 1.9 ohms. A particularly favorable improvement in the conductance is thus surprisingly obtained with tin or cadmium.

It is also possible to apply to the priming layer of copper applied without current, nickel layers without current by dipping into a nickel salt bath kept in an alkaline pH range, without impairment of the adhesion and flexibility of the coatings prepared by using the process according to this invention.

The plastic surfaces rendered conducting by the process according to this invention are particularly suitable even at low conductances, such as are obtained solely by the priming layers of iron and copper applied without current, for leaking away static electricity and also for the production of electrical shields against high frequency electrical alternating fields. It is possible to make condensers having very small dimensions advantageously from sheeting which has been coated in the above-mentioned way. Such sheeting is also eminently suitable as backing for magnetic recording media having oxidic storage material. Sound recording tape which has already been printed may be subsequently provided on the rear side with a conducting layer by the process according to this invention. If the priming layers applied without current are additionally coated with copper or other metals by a galvanic method, they are suitable as switch foils for magnetic recording media, for example for fitting to the beginnings and/or ends of commercial sound recording tapes. If salts or mixtures of salts of magnetically active material be used for the galvanising, very adherent, abrasion resistant magnetic coatings are obtained which may be used direct as magnetic recording media. As compared with oxidic recording media, metallic recording media have the advantage of higher modulation capacity.

Another application for the new coating method is the production of locally restricted surface or linear coatings on any plastics sheets or other articles. For this purpose the conducting lacquer containing dispersed iron used as the priming coating is printed for example by means of stencils onto the plastics surface and the necessary increase in the conductance is effected by dipping the sheet or article into the dip containing a copper salt solution. The conductive design having any desired boundary or the conductive stripes thus formed may be used in the same way as printed circuits prepared by prior art methods.

In carrying out the process for the coating of sheeting it is also possible to proceed as follows: During the winding up of the tape which has only been coated with dispersed iron, a web of sheet material provided with spacing elements or a wide-meshed fabric is allowed to run into the tape roll which is then to be further coated with copper so that the coated faces of the sheeting do not directly contact each other. This packed roll is then dipped into the coppering liquor for a period of one to fifteen minutes depending on the desired thickness of the copper layer to be applied without current. It is then rinsed first with acidulated water and then with pure water and finally blown dry. In this way lengths of tape of about 1000 metres may be uniformly coated in a comparatively short operation; the sheeting or fabric interlayer can be removed during the ensuing cutting process.

The invention is further illustrated by the following examples.

*Example 1*

A dispersion of 76 parts of very finely divided iron powder, 22 parts of afterchlorinated polyvinyl chloride lacquer, 1 part of copper stearate and 1 part of a water-soluble dispersing agent is prepared in a colloid mill with an addition of about three times the amount of a suitable solvent. When an optimum fine dispersion of the solid particles has been achieved, the dispersion is filtered in a closed chamber under nitrogen at a pressure of about 2 atmospheres gauge through wadding (cellulose or wool filter). The conducting lacquer thus obtained is then applied to a sheet of polyvinyl chloride by rollers or by pouring. In the case of shaped articles, the conducting lacquer is applied by spraying or dipping. The reciprocal conductance of this first priming coating is about 28,000 to 30,000 ohms. It is measured on a tape having an area of 10 sq. cm. with a length of 50 mm. and a width of 20 mm. The electrodes are applied to the shorter sides of the tape. Application of the conducting lacquer of extremely finely dispersed iron may be facilitated and improved by the additional action of a magnetic field. A polarized magnetic field or a magnetic alternating field may be used depending on the subsequent use of the conducting layer. A tape to be coated may be passed parallel or perpendicular to the lines of force depending on the effect desired. The sheet coated with a priming layer is dried at a temperature of from 20° to 50° C. and passed at a rate of four to six meters per minute through a liquor which contains dissolved in each liter of water, 30 parts of copper sulfate, 6 parts of concentrated sulfuric acid, 6 parts of tartaric acid and 6 parts of trimethylaminoacetic acid. After a short time, even at room temperature, the iron layer is removed with disengagement of hydrogen and a lustrous coherent copper layer is formed in its place which adheres very firmly to the backing and has a thickness of about 2 microns. A reciprocal conductance of about 0.5 ohm is measured on a strip of tape having an area of 10 sq. cm. from the coppered sheeting obtained without current in the said manner. The thickness of the priming layer thus obtained is dependent to a substantial extent on the rate at which the sheeting is passed through the coppering liquor.

*Example 2*

A sheet coated without current according to Example 1 is additionally passed at room temperature through a liquor in each liter of which are dissolved 8 parts of mercury chloride and 2 parts of concentrated hydrochloric acid. The sheet thus treated is washed and then passed through a further dipping bath in which 50 parts of potassium silver cyanide, 10 parts of tartaric acid and 30 parts of 25% ammonia have been dissolved per liter. The sheet is again rinsed with water, dried by blowing with air and wound up. During passage through the first mercury chloride liquor, the copper foil is amalgamated with a layer thickness of about 0.5 micron, and during passage through the following silver liquor is further provided with a silver layer of 1 to 2 microns. Reciprocal conductance measured on the additionally coated sheet is 0.2 to 0.4 ohm depending on the thickness of the layer. If the silver layer is polished, it has a lustrous appearance. It is very homogeneous and adherent.

*Example 3*

A polyester sheet is pretreated with a 2 to 20% solution of polyvinyl butyrate in a mixture of toluene and tertiary butanol, and dried. A dispersion consisting in the dry state of 80 parts of dispersed iron powder, 18 parts of polyvinyl butyrate, 1 part of copper oleate and 1 part of stearic acid is applied to the pretreated tape as a conducting lacquer which forms the priming layer. The tape obtained in this way is then further treated and provided with copper layers in the manner described in Example 1, very adherent lustrous coatings being thus formed. In this case also, after pretreatment with mercury, silver may be deposited without current on the sheet and it forms a firmly adherent deposit. Application of a galvanic coating on the priming layers applied without current also offers no difficulty. A polyester lacquer which is dissolved in a mixture of equal parts of dioxane and tetrahydrofuran, or a polyamide lacquer dissolved in a mixture of methanol, water and benzene, may be used instead of polyvinyl butyrate.

*Example 4*

A tape coated with copper which has been prepared according to Example 1 is passed as cathode through a liquor containing 48.6 parts of the disodium salt of ethylene diamine tetracetic acid, 44.3 parts of cadmium acetate and about 5 parts of concentrated hydrochloric acid dissolved in each liter of water. The disodium salt of nitrilotriacetic acid and other polybasic carboxylic acids which are capable of forming complexes may also be used instead of ethylene diamine tetracetic acid. The pH value of the solution should be about 5 to 6. A metal band a V2A-steel, cadmium or platinum is used as the anode. A current of about 2.5 amperes per sq. dm. and 2 to 3 volts is used in this galvanic bath. The tape coated with copper acquires a layer of cadmium about 3 microns in thickness which may be polished to a high gloss. The reciprocal conductance of this cadmium layer is 0.183 ohm on a standard tape of 10 sq. cm. at an electrode spacing of 5 cm. Even upon vigorous mechanical stress, for example by repeated rubbing of the coating by means of a glass rod, the electrical resistance does not rise above 0.25 ohm. Rubbing is sometimes necessary to achieve a highly lustrous surface of the coating. Very pale coatings resembling silver are obtained with 60 parts of tin chloride instead of cadmium acetate at a pH value of 1 to 2 and a current of 2 to 4 amps/sq. dm. and 2 to 3 volts within five to ten minutes. The tin coating exhibits the same resistance values as cadmium but can be polished much more easily. Instead of the galvanic cadmium bath, it is possible to use an acid copper bath in which about 50 parts of copper and 5 parts of concentrated sulfuric acid are dissolved per liter of water. It is also possible to use alkali metal cyanide liquors. Chromium deposits are obtained from acid chromic acid baths at a current density of 10 amps/sq. dm. and a bath temperature of 35° C. Their resistance values are about 0.35 ohm. They are very hard and highly lustrous.

The sheets obtained according to this example may advantageously be used as switch foils in conjunction with magnetic recording media and they do not appreciably change their electrical resistance even after prolonged use or under high mechanical stress.

*Example 5*

By using, instead of the galvanizing bath used in Example 4, a bath containing 68 parts of nickel sulfamate, 25 parts of cobalt chloride, 20 parts of trimethylaminoacetic acid and about 5 parts of ammonium hydroxide, dissolved in one liter of water, at a pH value of the solution of 6.8 to 7.3, a current density of 1 amp/sq. dm. and a voltage of 1 to 1.5 volts, a grey coating of a cobalt-nickel alloy is obtained which has a resistance value of 0.8 ohm and may be used as a switch foil. The metallic coating is effected in a layer of about 2 microns in ten minutes. By the addition of the trimethylaminoacetic acid, the pH value of the solution remains constant during the galvanization so that no correction is necessary by the addition of alkaline reagents. The sheet thus obtainable may be used with advantage for magnetic recording. The magnetic data are: coercive force about 400 oe., residual magnetization 1533 gs. and saturation induction 2330 gs.

We claim:

In a method for metallizing plastic surfaces by (a) applying to the surfaces a layer of small iron particles and a binder, (b) drying the layer and (c) coppering without current the resultant layer in a copper salt liquor, the improvement which comprises (1) applying the layer in a thickness from 1 to 10 microns with the use of iron particles having a particle size of 0.1 to 0.9 micron and being finely dispersed in a lacquer and (2) carrying out the coppering in an acidic copper salt liquor to which has been added up to 3% of a polybasic carboxylic acid and up to 3% of an amino acid.

References Cited

UNITED STATES PATENTS

| | | | |
|---|---|---|---|
| 2,958,610 | 11/1960 | Ramirez et al. | 117—130 X |
| 2,996,408 | 8/1961 | Lukes | 106—1 X |
| 3,027,309 | 3/1962 | Stephen | 204—43 |
| 3,031,344 | 4/1962 | Sher et al. | 117—212 |
| 3,095,309 | 6/1963 | Zeblisky et al. | 117—130 X |

FOREIGN PATENTS

| | | |
|---|---|---|
| 876,858 | 12/1956 | Great Britain. |
| 902,142 | 7/1962 | Great Britain. |

JOHN H. MACK, *Primary Examiner.*

HOWARD S. WILLIAMS, *Examiner.*

W. VAN SISE, *Assistant Examiner.*